United States Patent [19]

Qureshi

[11] 4,320,183
[45] Mar. 16, 1982

[54] GRID FOR BATTERIES

[75] Inventor: Nawaz M. Qureshi, Morrisville, Pa.

[73] Assignee: Exide Corporation, Philadelphia, Pa.

[21] Appl. No.: 232,576

[22] Filed: Feb. 9, 1981

[51] Int. Cl.³ .............................................. H01M 4/72
[52] U.S. Cl. .................................... 429/211; 429/241; 429/243
[58] Field of Search ............... 429/211, 233, 241, 234, 429/239, 243, 244

[56] References Cited

U.S. PATENT DOCUMENTS

| | | | |
|---|---|---|---|
| 1,044,831 | 11/1912 | Wackwitz | 429/211 |
| 1,608,469 | 11/1926 | Daniel | 429/241 |
| 3,453,145 | 7/1969 | Duddy | 429/244 |
| 3,690,950 | 9/1972 | Wheadon et al. | 429/241 X |
| 3,989,539 | 11/1976 | Grabb | 429/241 |
| 4,221,852 | 9/1980 | Qureshi | 429/211 |

Primary Examiner—Anthony Skapars
Attorney, Agent, or Firm—Raymond J. Kenny; Francis J. Mulligan

[57] ABSTRACT

Discloses a cast grid for supporting active mass in a lead-acid battery and gathering current from the active mass, the grid being characterized by a quasi-radial design adapted to provide efficient battery operation.

7 Claims, 2 Drawing Figures

GRID FOR BATTERIES

FIELD OF THE INVENTION

The present invention is concerned with grids for lead-acid battery electrodes and more particularly with radial grids having a so-called offset lug design.

BACKGROUND OF THE INVENTION

As is well known, lead-acid batteries can be produced in which each electrode consists of one or more plates, each plate being composed of a laminar grid surrounded by active material. By pasting the appropriate active material onto the grids, both the positive and the negative electrodes can be produced as stacks of such laminar plates. Within each plate the grid serves as a support for the active material as well as a conductor of electricity to and from the active material. The grid is a metallic structure made of lead or a lead alloy containing small amounts of such metals as calcium, antimony or tin. The many factors which influence the design of a battery grid impose constraints which are mutually inconsistent so that designs invariably represent compromises aimed at achieving an optimum combination of characteristics. Some important design-influencing factors are:

(a) minimizing the grid weight;
(b) minimizing the internal resistance of the grid;
(c) ensuring ease of fabricability of the grid;
(d) ensuring the ability to support the required amount of active material; and
(e) providing compartments of adequate dimensions to ensure the desired size of the active material "biscuits" contained therein.

A basic design for laminar grids includes a rectangular frame having a lug at or near a corner thereof, to constitute the current carrying connection of the plate, and a plurality of wires arranged orthogonally as "verticals" or "horizontals" to divide the space within the frame into discrete rectangular pockets. (The terms vertical and horizontal are used here with reference to the orientation of the wires when the grid is mounted in a battery, i.e., with the lug uppermost.) Because higher currents are carried by wires near the lug, attempts have been made to improve the resistance characteristics of such grids by use of tapering wires, increased number of verticals and use of some diagonal wires. One such grid is described in U.S. Pat. No. 3,989,539.

A different approach to improving the efficiency of grids, and one which is finding more and more favor in the art, involves adopting grid designs wherein the pattern of wires within the frame is not orthogonal. U.S. Pat. No. 3,453,145 describes grids wherein a first set of wires are disposed along the lines of radii emanating from the vicinity of the lug, while the second set of lines lie along arcs centered in the vicinity of the lug. A variation of this "radial" type of configuration is described in U.S. Pat. No. 3,690,950 wherein lightness of weight is achieved by using a frame and cross wires made of plastic, together with a set of metallic fingers radiating from a lug location to two sides of the frame. The latter type of grid requires more elaborate methods of fabrication than an all-metal grid which is castable.

I am also aware of a commercially produced battery which incorporates an all-metal grid having a lug at one corner, a set of horizontal wires and a set of diverging wires connecting the lug-carrying top of the frame to the bottom edge or to the side edge remove from the lug. This grid design will be referred to hereinafter as the "corner lug design".

For several reasons it is preferable to arrange for the lug of a grid to be substantially spaced from the grid corner. One reason for this is the improvement of performance, as judged by power output at high current discharge rate. Such performance is particularly important in automotive batteries wherein high cold-cranking available power is demanded. The off-setting of the lug is also beneficial to the overall design and method of construction of batteries using the grid. Thus as is well known, the assembly of a battery involves stacking together several grids, attaching a strap to their lugs and then positioning the stacks in the battery case with separating partitions therebetween. Connections then have to be made between pairs of straps separated by a partition. In the case of grids having lugs located at their corner, the straps to be interconnected are close to the battery casing. For engineering reasons, it has generally been necessary to resort to "risers" which are offset relative to the straps so that they are sufficiently spaced from the casing. On the other hand, where lugs are themselves offset relative to the grid corner, the straps to be interconnected in the battery are sufficiently spaced from the casing to allow for a rectilinear connection through the partition which not only saves cost and weight, but also minimizes internal resistance.

If attempts are made to cast radial grids of a normal cover lug design but having lugs offset relative to the grid corner, problems of lead flow are encountered which give rise to porosity in the lug region of the frame. This is because a relatively large amount of lead has to flow from the fill edge to the lug region; grids are almost invariably cast in pairs with the fill edge being the side edge nearer to the lug. The result may be an unacceptably high rate of rejection of the castings.

I am also aware of and the author of U.S. Pat. No. 4,221,852 which provides a radial grid design with a lug offset relative to the grid corner, which design obviates many of the aforedescribed problems. The present application is directed to a grid design which is a still further improvement in the art.

OBJECTS OF THE INVENTION

The invention is aimed at providing grids wherein the lug is displaced from the corner, the design of the grid being such as to enable the grids to be cast successfully and to provide improved battery performance.

A further object of the invention is to provide grids having performance and weight characteristics superior to any heretofore available.

SUMMARY OF THE INVENTION

According to the invention a storage battery grid which is readily castable in lead or a lead alloy and in which the grid members are geometrically arranged to provide minimized electrical resistance and maximized current flow paths to a lug comprises a generally rectangular frame consisting of opposed first and second edge members which constitute respectively top and bottom frame members of the grid when used in a battery, and opposed third and fourth edge members which constitute first and second side frame members of the grid when used in a battery. The top member is provided with an essentially rectangular, current-collecting lug positioned thereon and extending upwardly therefrom, said lug being positioned intermediate the center point of said top frame member and the corner of said frame where the first side member and said top member meet. The frame encloses as wire grid members;

(a) a plurality of essentially horizontal wire members spaced about equally apart one from another and each extending between and connecting the first and second side frame members;

(b) a radii terminating wire member extending from the top member, at a point about 65% to about 85% across the top member from the first side member. The radii terminating member extends toward and connects with the bottom member and intersects with said horizontal members;

(c) at least one wire member positioned essentially parallel to the radii terminating member and extending from the top member intermediate the point of intersection of said top member with the radii terminating member and the corner where of the top member and the second side meet;

(d) a plurality of diverging wire members extending obliquely downwardly from a plurality of points spaced along the top member between the intersection point of said radii terminating member with the top member and the side of the lug adjacent the first side member. The diverging members intersect at least one of the horizontal members and connect the top member with either the radii terminating member or the bottom member;

(e) at least one wire member intersecting the horizontal members, extending from said top member, from at least one point intermediate that side of the lug adjacent the first side member and the first side member. This member extends obliquely downwardly toward the first side member for a distance of about 20% of the height of said frame and then extends toward and connects with said bottom member in a direction essentially parallel to the direction of the nearest of said diverging members; and (f) at least one wire member intersecting some of the horizontal members and extending from the first side member at least one point intermediate the top member and said bottom member and connecting the first side member with the bottom member.

The frame and wires are all cast as an integral unit in a single operation. While essentially pure lead can be used, the melt employed will usually comprise a lead-based alloy such as one containing a small amount of calcium, antimony or tin as used in the manufacture of the so-called maintenance-free batteries.

It is advantageous to incorporate in the design of cast grids in accordance with the present invention the features of increasing cross-sectional area of wire members and frame members in a direction toward the lug. Roughly the cross-sectional area of wire members at or near the lug is advantageously 30% to 50% greater than the cross-sectional area of the same wire members near the bottom of the grid. A similar cross-sectional area applies to the top and first side frame members when comparing adjacent the lug and most removed from the lug.

BRIEF DESCRIPTION OF THE DRAWING

The drawing comprises

DETAILED DESCRIPTION OF THE INVENTION

Figure 1:
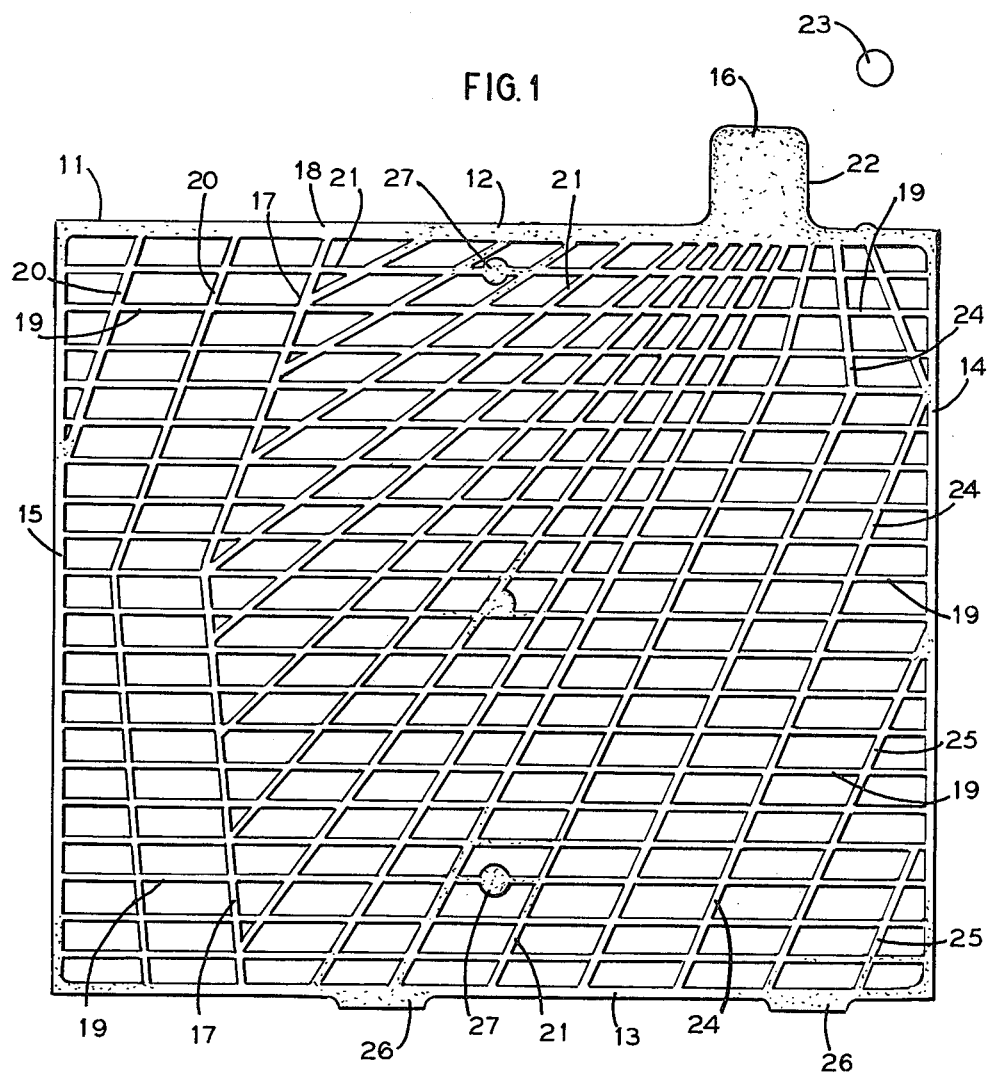
FIG. 1 which shows an external view in elevation of a cast grid of the present invention.

The grid design which is the subject of the present invention is shown in the drawing. Referring now to FIG. 1 thereof grid 11 is essentially rectangular having joined together top member 12, bottom member 13, first side member 14 and second side member 15. Top member 11 is provided with a lug 16 which extends upwardly from top member 12 and is positioned intermediate the center of top member 12 and the corner where first side member 14 and top member 12 meet. Radii terminating wire member 17 extends from top member 12 toward bottom member 13. As depicted, member 17 starts at a point on top member 12 about 70% of the distance across top member 12 from first side member 14. This point of departure 18 may be varied, for example a total of perhaps 10% or more of the indicated distance, e.g. from 65% to 75%. From point 18 member 17 extends downwardly and obliquely toward second side 15 for roughly about half the height of grid 11. Member 17 then further extends downwardly and obliquely toward first side member 14 until it reaches and connects with bottom 13. In its path radii terminating wire member 17 intersects all of a plurality of horizontal wire members 19 which extend between and connect first side member 14 and second side member 15. Horizontal wire members 19 are approximately equally spaced apart one from the other. Wire members 20 follow paths essentially parallel to that of radii terminating member 17 and may intersect second side 15. Radiating or diverging wire members 21 extend from a plurality of points on top member 12 lying between departure point 18 and first side 22 of lug 16. These points are spaced apart one from the other and the spacing generally increases in the direction from lug 16 toward second side 15. This increase in spacing can be understood better if one assumes that diverging wire members are radiating from one or more loci situated in area 23 external to grid 11. Additional wire members 24 originate on top member 12 from points spaced between lug 16 and first side 14. Members 24 initially slope downwardly from top member 12 in a direction toward first side member 14 and then slope downwardly and obliquely toward second side member 15 until they connect with bottom member 13. First side member 14 and bottom member 13 are connected by wire members 25. All of wire members 17, 20, 21, 24 and 25 intersect in essentially a flat manner with those of horizontal members 17 which they cross so as to provide a thin, essentially flat, wire matrix defining bisquit areas therebetween. These bisquit areas, which in a battery would be filled with active mass, appear in the drawing as blank spaces within grid 11 and are sized approximately as taught by the art to give reasonable, low resistance, electronic current transfer between the active mass and the wire grid members.

Advantageously as indicated in the drawing, by increasing width (thickness and cross-sectional shape being constant) frame members 12 and 14 and wire grid members 17, 20, 21 and 24 increase in cross-sectional area as lug 16 is approached. This increase in cross-sectional area is of the order of 30% based upon the area of any given member at that point most remote from lug 16. The cross-sectional shape of wire grid members is essentially hexagonal.

To complete the description of the drawing bottom member 13 is provided with feet 26 and mold knock-out areas 27 are positioned across the grid. These items are not significant with respect to the presently disclosed novel grid.

It is an advantage of the presently disclosed grid that with very nearly the same electrical resistance as prior radial grids, the present grid is substantially lighter in weight. Grid weight in one instance is reduced from 58 grams to an estimated weight of 51.5 grams (i.e. a weight reduction of about 11%) and the effective resistances are 1.05 mV/amp and 1.11 mV/amp respectively.

Figure 2:
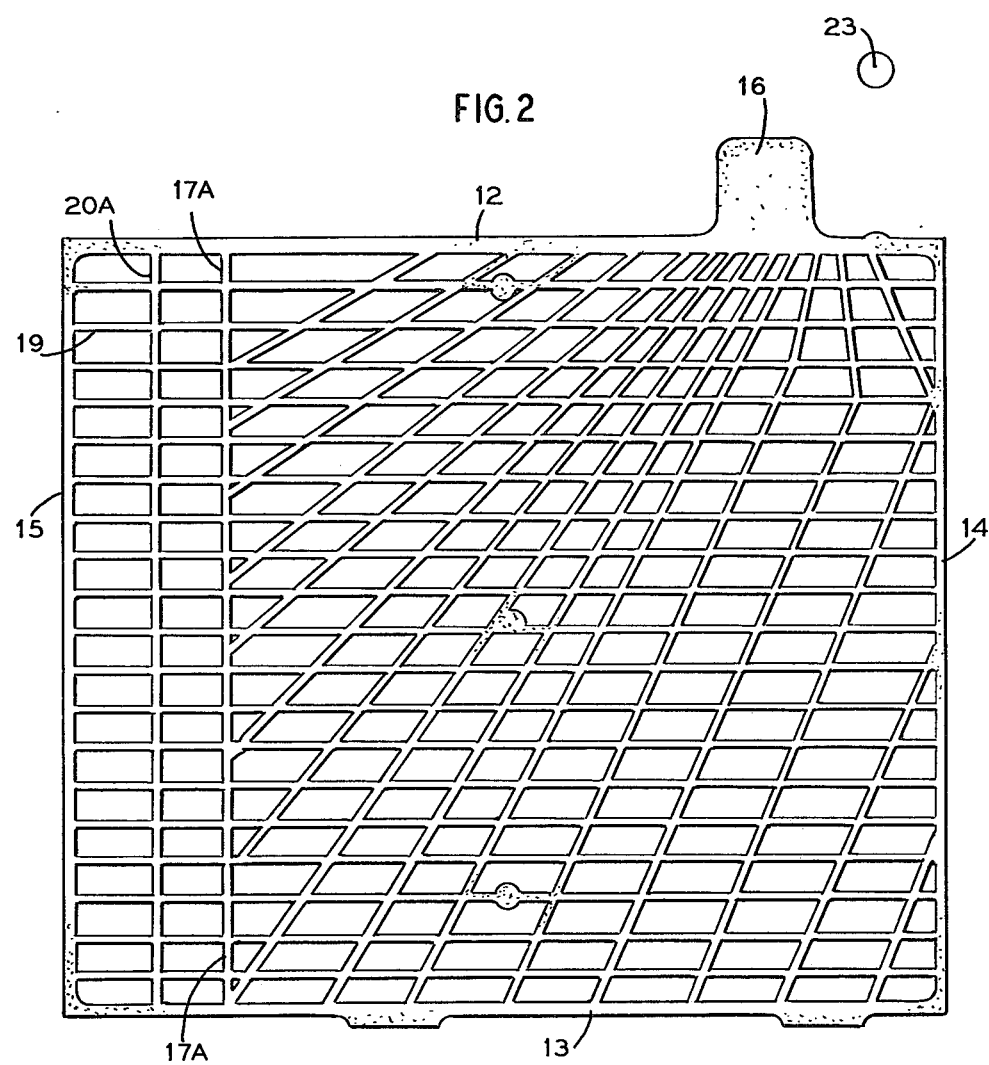
FIG. 2 which shows an external view in elevation of an alternative cast grid of the present invention.

An alternative embodiment of the grid of the present invention is depicted in FIG. 2. In common with the embodiment of FIG. 2, the alternative embodiment shown in FIG. 2 comprises rectangular grid 11, top member 12, bottom member 13, side members 14 and 15 and lug 16. In the embodiment of FIG. 2, the member which terminates radiating or diverging wire members 21 is a straight essentially vertically oriented terminating member 17A. In the area of grid 11 to the left of member 17A is parallel member 20A which, in conjunction with horizontal wire members 19, divides this area of the grid into a multiplicity of rectangular areas. In a battery these rectangular areas along with other grid wire defined areas will contain bisquits of active mass. In the embodiment of FIG. 2, radii terminating member 17A extends from top member 12 at a point approximately 80% to 85% of the distance across top member 12 from side member 14. Except for the particular configuration of members 17A and 20A, the embodiment of FIG. 2 is essentially identical to that of FIG. 1 and is advantageous in being more readily castable without significant sacrifice of superior electrical characteristics as compared to the embodiment of FIG. 1.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An integral, cast, high performance radial grid for supporting active mass in a lead-acid battery comprising an essentially flat rectangualr frame, one long side of said frame being the top member and the other long side being the bottom member, with a first and second side frame members connecting said top member and said bottom member, said top member having an essentially rectangular, current-collecting lug positioned thereon and extending upwardly therefrom, said lusg being positioned intermediate the center point of said top frame member and the corner of said frame where said first side member and said top member meet said frame enclosing as wire grid members;
  (a) a plurality of essentially horizontal wire members spaced about equally apart one from another and each extending between and connecting said first and second side frame members;
  (b) a radii terminating wire member extending from said top member, at a point about 65% to about 85% across said top member from said first side member, toward and connecting with said bottom member and intersecting said horizontal members;
  (c) at least one wire member positioned essentially parallel to said radii terminating member and extending from said top member intermediate said point of intersection of said top member with said radii terminating member and the corner of juncture of said top member and said second side;
  (d) a plurality of diverging wire members extending obliquely downwardly from a plurality of points spaced along said top member between the intersection point of said radii terminating member with said top member and the side of said lug adjacent said first side member, said diverging members intersecting at least one of said horizontal members and connecting said top member with one of said radii terminating member of said bottom member;
  (e) at least one wire member intersecting said horizontal members, extending from said top member, from at least one point intermediate that side of said lug adjacent said first side member and said first side member, obliquely downwardly toward said first side member for a distance of about 20% of the height of said frame and then extending toward and connecting with said bottom member in a direction essentially parallel to the direction of the nearest of said diverging members; and
  (f) at least one wire member intersecting some of said horizontal members and extending from said first side member at least one point intermediate said top member and said bottom member and connectng said first side member with said bottom member.

2. A radial grid as in claim 1 wherein said radii terminating member and said at least one member parallel thereto extend obliquely toward said second side member and downwardly from said top member for about half the height of said frame and then extend obliquely toward said first side member and downwardly to said bottom member and wherein said radii terminating member originates on said top member at a point about 65% to 75% across said top member as measured from the side nearer said lug.

3. A radial grid as in claim 1 wherein said radii terminating member and said at least one member parallel thereto extend essentially vertically between said top member and said bottom member and wherein said radii terminating member originates on said top member at a point about 80% to 85% across said top member as measured from the side nearer said lug.

4. A radial grid as in claim 1 wherein said frame members defined in subparagraphs D and E have gradually increasing cross-sectional areas in the direction of bottom to top.

5. A radial grid as in claim 1 wherein said top member has a gradually increasing cross-sectional area in the direction of said second side member to said first side member.

6. A radial grid as in claim 1 wherein said first side member has a gradually increasing cross-sectional area in the direction of bottom to top.

7. A radial grid as in claim 1 wherein said frame members defined in subparagraphs D and E have gradually increasing cross-sectional areas in the direction of bottom to top; wherein said top member has a gradually increasing cross-sectional area in the direction of said second side member to said first side member; and, wherein said first side member has a gradually increasing cross-sectional area in the direction of bottom to top.

* * * * *